United States Patent
Kim et al.

(10) Patent No.: US 10,125,664 B2
(45) Date of Patent: Nov. 13, 2018

(54) COOLING SYSTEM FOR VEHICLE

(71) Applicants: Hyundai Motor Company, Seoul (KR); INZICONTROLS CO., LTD., Siheung, Gyeonggi-Do (KR)

(72) Inventors: Jae Yeon Kim, Gyeonggi-do (KR); Wan Je Cho, Gyeonggi-do (KR); Yeon Ho Kim, Seoul (KR); Jong Man Park, Gyeonggi-do (KR)

(73) Assignees: HYUNDAI MOTOR COMPANY, Seoul (KR); INZICONTROLS CO., LTD., Siheung, Gyeonggi-do (KR)

( * ) Notice: Subject to any disclaimer, the term of this patent is extended or adjusted under 35 U.S.C. 154(b) by 135 days.

(21) Appl. No.: 15/196,246

(22) Filed: Jun. 29, 2016

(65) Prior Publication Data
US 2017/0167355 A1    Jun. 15, 2017

(30) Foreign Application Priority Data

Dec. 10, 2015    (KR) .......................... 10-2015-0176337

(51) Int. Cl.
*F01P 7/16* (2006.01)
*B60K 11/02* (2006.01)
(Continued)

(52) U.S. Cl.
CPC .............. *F01P 7/167* (2013.01); *B60K 11/02* (2013.01); *F01P 3/20* (2013.01); *F01P 5/10* (2013.01); *F01P 11/04* (2013.01); *B60Y 2200/92* (2013.01)

(58) Field of Classification Search
CPC .......... B60H 1/034; B60H 1/02; B60H 1/143; B60H 1/004; B60H 2001/00307;
(Continued)

(56) References Cited

U.S. PATENT DOCUMENTS 4,794,883 A * 1/1989 Fukami .................... B62D 5/07
                                                123/41.12
4,935,689 A * 6/1990 Fujikawa ........... B60H 1/00364
                                                123/142.5 R
(Continued)

FOREIGN PATENT DOCUMENTS

JP    H10266856 A    10/1998
JP    2006-103537 A    4/2006
(Continued)

*Primary Examiner* — Orlando E Aviles Bosques
*Assistant Examiner* — Jose O Class-Quinones
(74) *Attorney, Agent, or Firm* — Mintz Levin Cohn Ferris Glovsky and Popeo, P.C.; Peter F. Corless

(57) ABSTRACT

A cooling system for a vehicle includes: an engine cooling circuit circulating a coolant to an engine mounted in the vehicle; an electronics cooling circuit circulating the coolant to an electrical equipment and a motor mounted in the vehicle; a reservoir tank connected to the engine and the motor and respectively compensating the coolant to the engine cooling circuit and the electronics cooling circuit; and a control valve connected to a first connection pipe connected to the reservoir tank and selectively connected to the engine cooling circuit and the electronics cooling circuit depending on a temperature change of the coolant during a cold driving mode or a warm driving mode of the vehicle to control a flow of the coolant.

11 Claims, 3 Drawing Sheets

(51) Int. Cl.
  *F01P 3/20* (2006.01)
  *F01P 5/10* (2006.01)
  *F01P 11/04* (2006.01)

(58) Field of Classification Search
  CPC ...... F01P 7/026; F01P 7/165; F01P 2007/146; F01P 7/16; F01P 2005/105; F01P 7/167; F01P 11/04; F01P 5/10; F01P 3/20; B60K 11/02; B60Y 2200/92
  See application file for complete search history.

(56) References Cited

U.S. PATENT DOCUMENTS

| | | | |
|---|---|---|---|
| 5,598,705 A * | 2/1997 | Uzkan | F01P 7/165 60/599 |
| 6,357,541 B1 * | 3/2002 | Matsuda | B60K 6/22 165/43 |
| 6,616,059 B2 * | 9/2003 | Sabhapathy | B60H 1/04 123/142.5 E |
| 7,128,025 B1 * | 10/2006 | Westhoff, Jr. | F01P 3/202 123/41.01 |
| 8,215,427 B2 * | 7/2012 | Rouaud | B60K 6/26 180/65.27 |
| 8,875,820 B2 * | 11/2014 | Yamashita | E02F 9/2095 165/104.33 |

FOREIGN PATENT DOCUMENTS

| | | |
|---|---|---|
| JP | 2010-185298 A | 8/2010 |
| JP | 2013-086717 A | 5/2013 |
| JP | 5348063 B2 | 11/2013 |
| KR | 2010-0057190 A | 5/2010 |
| KR | 2012-0033588 A | 4/2012 |
| KR | 10-2012-0137655 A | 12/2012 |

* cited by examiner

COOLING SYSTEM FOR VEHICLE

CROSS-REFERENCE TO RELATED APPLICATION

This application claims under 35 U.S.C. § 119(a) the benefit of Korean Patent Application No. 10-2015-0176337 filed in the Korean Intellectual Property Office on Dec. 10, 2015, the entire contents of which are incorporated herein by reference.

BACKGROUND (a) Field of the Invention

The present invention relates to a cooling system for a vehicle, more particularly, to a cooling system configured to inject a coolant to one reservoir tank in conjunction with an engine cooling circuit and an electronics cooling circuit.

(b) Description of the Related Art

Recently, development of environmentally-friendly vehicles has advanced with a goal of substantially replacing internal combustion engine vehicles. In general, an environmentally-friendly vehicle is classified into an electric vehicle that is driven using a fuel cell or electricity as a power source, and a hybrid vehicle that is driven using an engine and an electric battery.

An electric vehicle that uses a fuel cell converts chemical reaction energy of oxygen and hydrogen to electrical energy to produce a driving torque, and in this process, thermal energy is generated by a chemical reaction within the fuel cell, where it is essential in maximizing performance of the fuel cell to effectively remove the generated heat.

Further, a hybrid vehicle generates a driving torque by driving a motor using electricity that is supplied from an electric battery or the fuel cell together with an engine operated with general fuel, and upon effectively removing heat occurring in a fuel cell, a battery, and a motor, performance of the motor may be improved.

For example, a hybrid vehicle can be driven in an electric vehicle (EV) mode that is driven by a motor upon constant speed driving, gentle driving, and low and medium constant speed driving. In the event of acceleration and rapid acceleration, an internal combustion engine and a motor are simultaneously driven, and upon high constant speed driving, a motor is stopped and the hybrid vehicle is operated by the internal combustion engine.

Accordingly, in a hybrid vehicle, an engine cooling means for circulating coolant in an engine and an electrical equipment cooling means for circulating coolant in an electric power component including a motor are each provided.

However, in such a conventional hybrid vehicle, as an engine cooling circuit and an electronics cooling circuit are configured separate closed and/or sealed circuits. Accordingly, as two reservoir tanks must be provided for the circuits, they are difficult to be mounted in a narrow engine compartment, and a manufacturing cost is increased due to the large number of constituent elements.

Also, the weight is increased due to the large number of constituent elements, and productivity may be deteriorated by requiring a mounting time of each reservoir tank.

The above information disclosed in this Background section is only for enhancement of understanding of the background of the invention and therefore it may contain information that does not form the prior art that is already known in this country to a person of ordinary skill in the art.

SUMMARY

Accordingly, the present invention provides a cooling system for a vehicle injecting coolant to one reservoir tank in conjunction with a hybrid vehicle engine cooling circuit and an electronics cooling circuit so as to reduce the number of constituent elements, thereby reducing weight and manufacturing cost.

A cooling system for a vehicle according to an exemplary embodiment of the present invention includes an engine cooling circuit circulating a coolant to an engine mounted in the vehicle; an electronics cooling circuit circulating the coolant to an electrical equipment and a motor mounted in the vehicle; a reservoir tank connected to the engine and the motor and respectively compensating the coolant to the engine cooling circuit and the electronics cooling circuit; and a control valve connected to a first connection pipe connected to the reservoir tank and selectively connected to the engine cooling circuit and the electronics cooling circuit depending on a temperature change of the coolant during a cold driving mode or a warm driving mode of the vehicle to control a flow of the coolant.

The engine cooling circuit may include an engine radiator connected to the engine through a first pipe and cooling the coolant through a heat exchange with an external air; a thermostat connected to the engine radiator through the first pipe; and a first water pump provided on the first pipe between the thermostat and the engine.

A heater respectively connected to the first pipe may be provided between the engine and the engine radiator, and between the engine and the water pump.

The control valve may be connected to the first pipe through first supply pipe between the thermostat and the first water pump.

The control valve may maintain the first supply pipe with the opened state during the cold driving mode or the warm driving mode of the vehicle.

The reservoir tank may be connected to the first pipe through a second connection pipe between the engine and the engine radiator.

The electronics cooling circuit may include an electric radiator connected to the electrical equipment and the motor through a second pipe and cooling the coolant through a heat exchange with the external air; and a second water pump provided on the second pipe between the electric radiator and the electrical equipment.

The control valve may be connected to the second pipe through a second supply pipe between the electric radiator and the second water pump.

The control valve may close the second supply pipe during the warm driving of the vehicle to prevent the coolant from inflowing to the electronics cooling circuit from the reservoir tank.

As described above, according to the cooling system for the vehicle according to an exemplary embodiment of the present invention, by injecting the coolant to one reservoir tank by interworking the engine cooling circuit and the electronics cooling circuit in the hybrid vehicle, the number of constituent elements may be reduced, thereby reducing the weight and the manufacturing cost.

Also, by mounting only one reservoir tank, the spatial utility may be improved in the narrow engine compartment, and the vehicle mounting ability and the pipe layout may be simplified.

Further, the mounting time of the reservoir tank may be shortened such that the productivity may be improved.

DETAILED DESCRIPTION OF THE EMBODIMENTS

Figure 1:
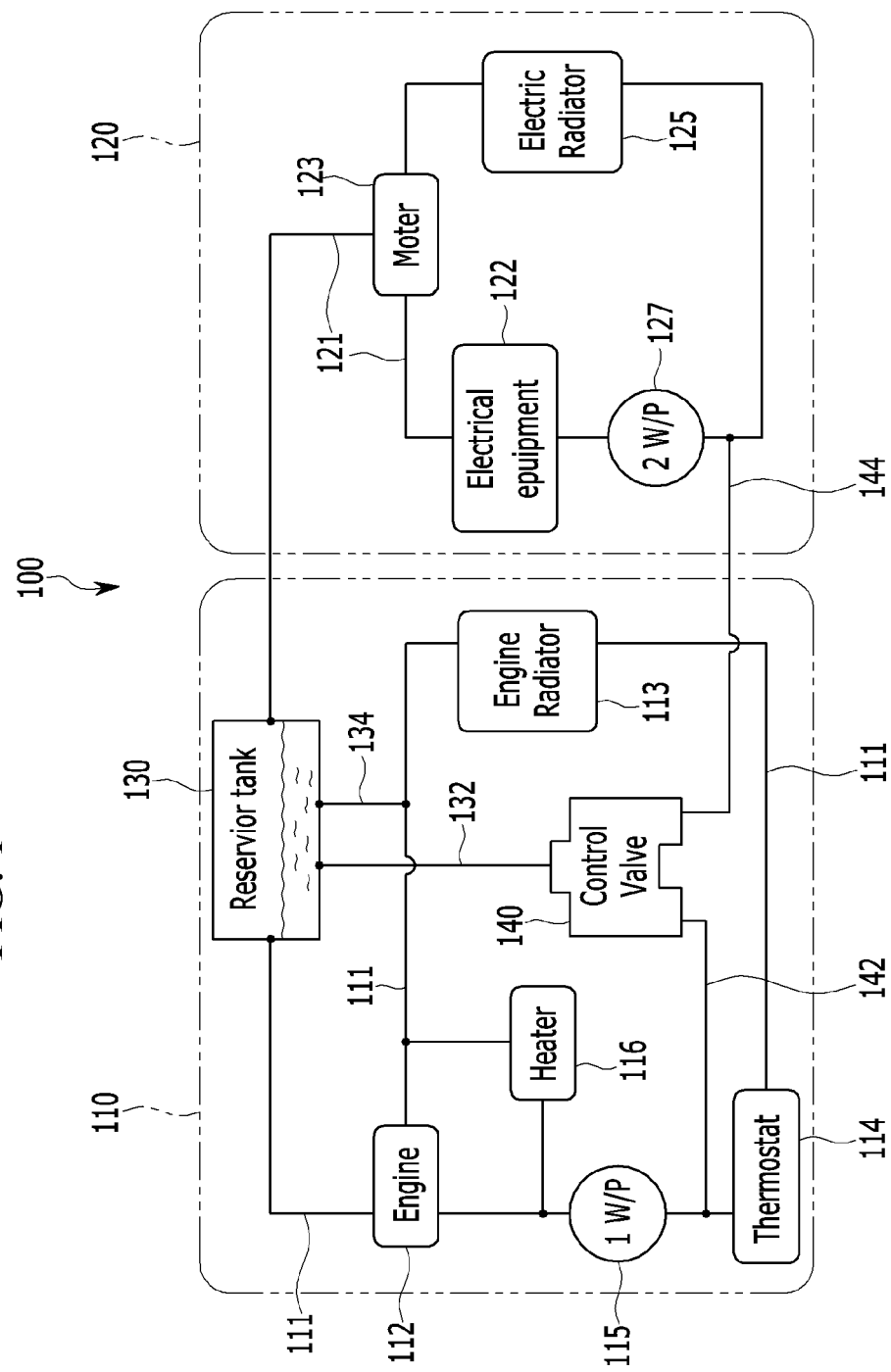
FIG. 1 is a block diagram of a cooling system for a vehicle according to an exemplary embodiment of the present invention.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present invention may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

An exemplary embodiment of the present invention will hereinafter be described in detail with reference to the accompanying drawings.

Exemplary embodiments disclosed in the present specification and the constructions depicted in the drawings are only the preferred embodiments of the present invention, and do not cover the entire scope of the present invention. Therefore, it will be understood that there may be various equivalents and variations at the time of the application of this specification.

FIG. 1 is a block diagram of a cooling system of a vehicle according to an exemplary embodiment of the present invention.

A cooling system 100 for a vehicle according to an exemplary embodiment of the present invention can be applied to a hybrid vehicle using a driving torque of an engine 112 and a driving torque of a motor 123.

The cooling system 100 for the vehicle, as shown in FIG. 1, includes an engine cooling circuit 110, an electronics cooling circuit 120, a reservoir tank 130, and a control valve 140.

First, the engine cooling circuit 110 circulates and cools a coolant to the engine 112 mounted in the vehicle. The engine cooling circuit 110 may include an engine radiator 113, a thermostat 114, and a first water pump 115.

The engine radiator 113 is connected to the engine 112 through a first pipe 111 and cools the coolant through a heat exchange with external air. The engine radiator 113 may be provided in the front of the vehicle.

The thermostat 114 is connected to the engine radiator 113 through the first pipe 111. The thermostat 114 may selectively open or close the first pipe 111 connected to the engine radiator 113 depending on a temperature of the coolant exhausted from the engine 112.

Also, the first water pump 115 is provided on the first pipe 111 between the thermostat 114 and the engine 111. The first water pump 115 circulates the coolant to the first pipe 111 such that the coolant cooled in the engine radiator 113 is supplied to the engine 111.

In this case, the heater 116 respectively connected to the first pipe 111 may be provided between the engine 112 and the engine radiator 113, and between the engine 112 and the water pump 116.

In the present exemplary embodiment, the electronics cooling circuit 120 circulates the coolant to the electrical equipment 122 mounted in the vehicle to be cooled. The electronics cooling circuit 120 may include an electric radiator 125 and a second water pump 127.

The electric radiator 125 is connected to the electrical equipment 122 and the motor 123 through the second pipe 121 and cools the coolant through the heat exchange with the external air.

Here, the electric radiator 125 is disposed on the front of the engine radiator 113.

Also, the second water pump 127 may be provided on the second pipe 121 between the electric radiator 125 and the electrical equipment 122.

The first water pump 115 circulates the coolant to the second pipe 121 such that the coolant cooled in the electric radiator 125 is supplied to the electrical equipment 122 and the motor 123.

In the present exemplary embodiment, the reservoir tank 130 is connected to the engine 112 and the motor 123 and respectively compensates the coolant while interworking in the engine cooling circuit 110 and the electronics cooling circuit 120.

One reservoir tank 130 may be mounted in the engine compartment of the vehicle.

Here, the reservoir tank 130 may be connected to the first pipe 111 through the second connection pipe 134 between the engine 112 and the engine radiator 113.

Also, the control valve 140 is connected to the first connection pipe 132 connected to the reservoir tank 130.

The control valve 140 is selectively connected to the engine cooling circuit 110 and the electronics cooling circuit 120 depending on the temperature change of the coolant during a cold driving mode or a warm driving mode of the vehicle, thereby controlling the flow of the coolant.

Here, the control valve 140 may be connected to the first pipe 111 through the first supply pipe 142 between the thermostat 114 and the first water pump 115.

Also, the control valve 140 may be connected to the second pipe 121 through the second supply pipe 142 between the electric radiator 125 and the second water pump 127.

That is, the control valve 140 may interwork between the engine cooling circuit 110 and the electronics cooling circuit 120 through the first and second supply pipes 142 and 144 to commonly use the reservoir tank 130 in the engine cooling circuit 110 and the electronics cooling circuit 120.

The control valve 140 may maintain the first supply pipe 142 with the opened state during the cold driving or the warm driving of the vehicle. Also, the control valve 140 closes the second supply pipe 144 during the warm driving of the vehicle for preventing the coolant from inflowing to the electronics cooling circuit 120 from the reservoir tank 130.

Next, the operation and the action of the cooling system 100 for the vehicle according to an exemplary embodiment of the present invention constituted as above will be described in detail.

Figure 2:
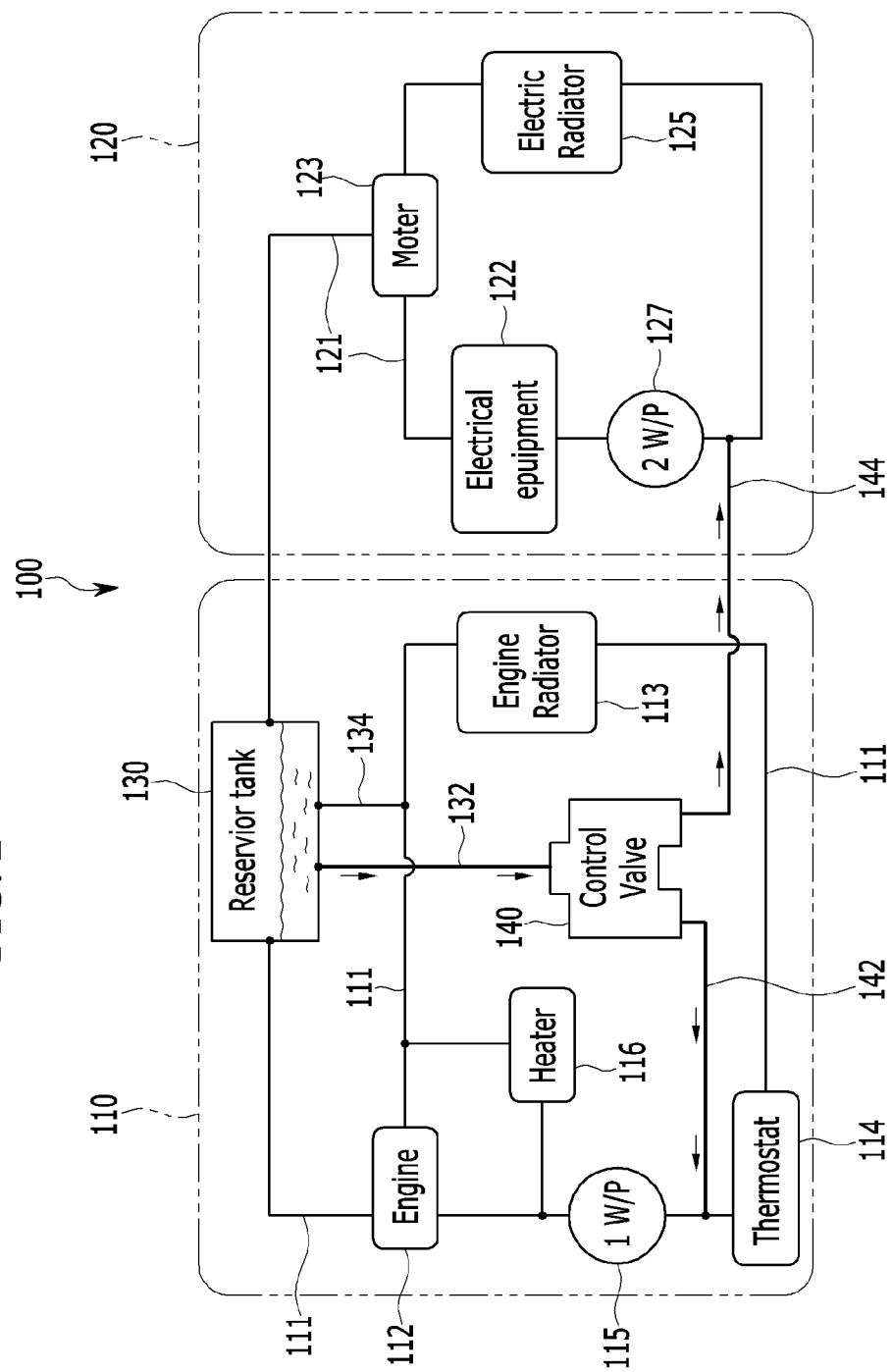
FIG. 2 is an operation state diagram of the cooling system of FIG. 1 during cold driving.
Figure 3:
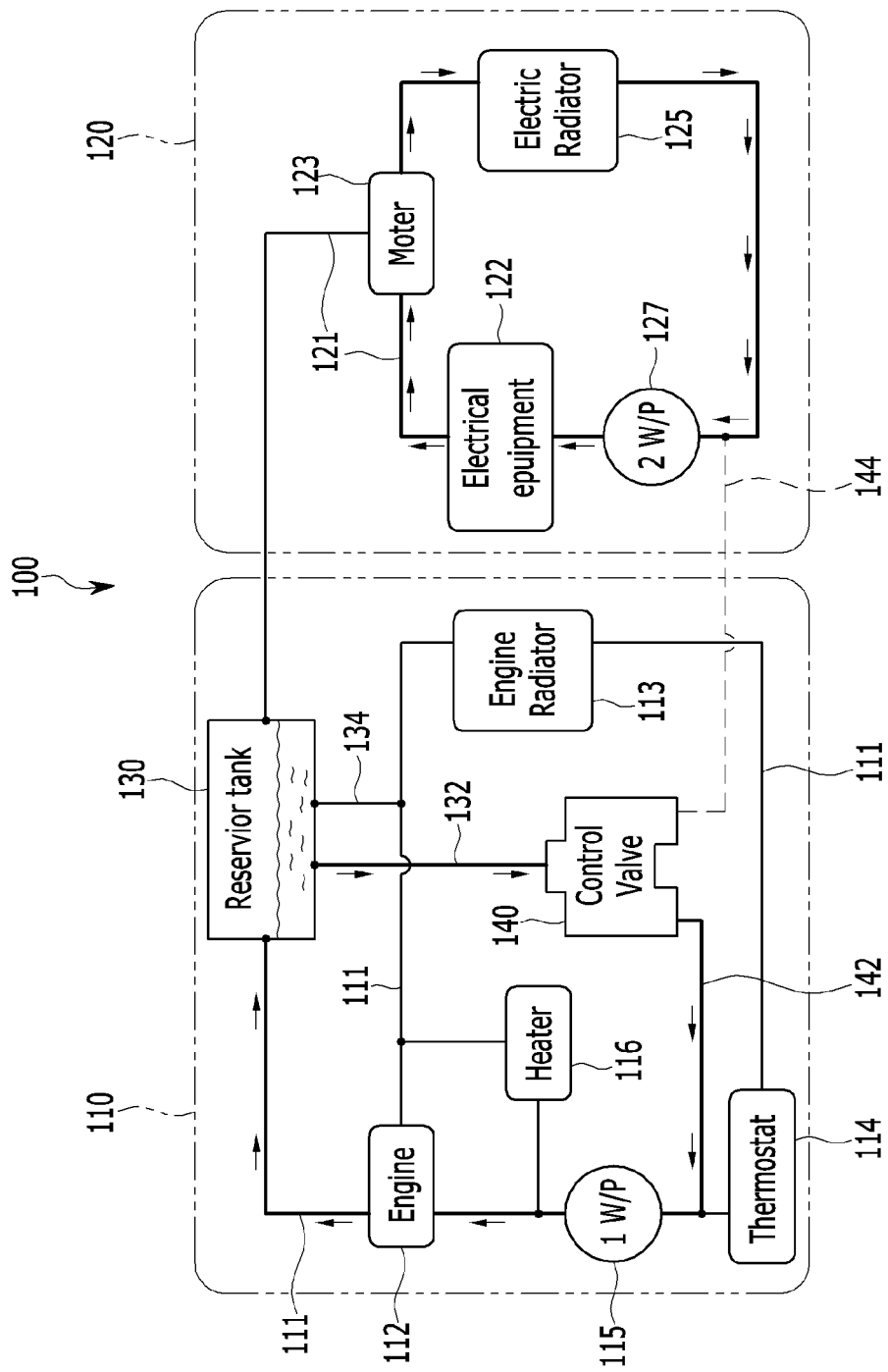
FIG. 3 is an operation state diagram of the cooling system of FIG. 1 during warm driving.

FIG. 2 is an operation state diagram of a cooling system for a vehicle according to an exemplary embodiment of the present invention during cold driving, and FIG. 3 is an operation state diagram of the cooling system for the vehicle according to an exemplary embodiment of the present invention during warm driving.

First, the operation of the cooling system 100 during cold driving of the vehicle will be described.

Referring to FIG. 2, in the cooling system 100 for the vehicle according to an exemplary embodiment of the present invention, the control valve 140 fully opens the first supply pipe 142 and the second supply pipe 144 during cold driving (e.g., a coolant temperature less than 30° C.) of the vehicle.

Thus, the coolant stored in the reservoir tank 130 inflows to the control valve 140 through the first connection pipe 132 and inflows to the engine cooling circuit 110 and the electronics cooling circuit 120 through the opened first and second supply pipes 142 and 144.

The coolant stored in the reservoir tank 130 may inflow to the first pipe 111 by a predetermined amount through the second connection pipe 134.

That is, the second connection pipe 134 inflows the coolant to the engine cooling circuit 110 to satisfy a flow rate of the coolant required in the engine cooling circuit 110.

Thus, the coolant is respectively compensated to the cooling circuits 110 and 120, while circuiting the first pipe 111 and the second pipe 121 through the operation of the first water pump 115 and the second water pump 127, the coolant may inflow to the engine 112, and the electrical equipment 122 and the motor 123.

That is, in the present exemplary embodiment, as the cooling system 100 supplies the coolant stored in one reservoir tank 130 to the engine cooling circuit 110 and the electronics cooling circuit 120, the injection time of the coolant may be reduced.

Also, in contrast to cool driving, the operation of the cooling system 100 during warm driving of the vehicle will be described.

Referring to FIG. 3, in the cooling system 100 for the vehicle according to an exemplary embodiment of the present invention, the control valve 140 opens the first supply pipe 142 and closes the second supply pipe 144 during warm driving (e.g., the coolant temperature greater than 30° C.) of the vehicle.

Thus, the coolant stored in the reservoir tank 130 inflows to the control valve 140 through the first connection pipe 132 and inflows to the engine cooling circuit 110 through the opened first supply pipe 142.

Also, the inflow of the coolant from the reservoir tank 130 is stopped by the electronics cooling circuit 120.

That is, during warm driving of the vehicle, the hot coolant circulating the engine cooling circuit 110 inflows to the reservoir tank 130. Accordingly, since the temperature of the coolant stored in the reservoir tank 130 is increased, the coolant of the high temperature is prevented from inflowing to the electrical equipment 122 and the motor 123.

Accordingly, the coolant stored in the reservoir tank 130 is compensated by the engine cooling circuit 110.

Also, the engine cooling circuit 110 circulates the coolant to the first pipe 111 through the operation of the first water pump 115 to cool the engine 112.

In this case, the electronics cooling circuit 120 may cool the electrical equipment 122 and the motor 123 while circulating the coolant cooled from the electric radiator 125 to the second pipe 121 through the operation of the second water pump 127.

According to the cooling system 100 for the vehicle according to an exemplary embodiment of the present invention, by injecting the coolant to one reservoir tank 130 by interworking the engine cooling circuit 110 and the electronics cooling circuit 120 in the hybrid vehicle, the number of constituent elements may be reduced, thereby reducing the weight and the manufacturing cost.

Also, by mounting only one reservoir tank 130, the spatial utility may be improved in the narrow engine compartment, and the vehicle mounting ability and the pipe layout may be simplified.

Further, the mounting time of the reservoir tank 130 may be shortened such that productivity may be improved.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A cooling system for a vehicle, comprising:
   an engine cooling circuit circulating a coolant to an engine mounted in the vehicle;
   an electronics cooling circuit circulating the coolant to an electrical equipment and a motor mounted in the vehicle;
   a reservoir tank directly connected to the engine via a first pipe and directly connected to the motor via a second pipe and respectively compensating the coolant to the engine cooling circuit and the electronics cooling circuit; and
   a control valve connected to a first connection pipe connected to the reservoir tank and selectively connected to the engine cooling circuit and the electronics cooling circuit depending on a temperature change of the coolant during a cold driving mode or a warm driving mode of the vehicle to control a flow of the coolant.

2. The cooling system for the vehicle of claim 1, wherein the engine cooling circuit includes:

an engine radiator connected to the engine through the first pipe and cooling the coolant through a heat exchange with an external air;

a thermostat connected to the engine radiator through the first pipe; and a first water pump provided on the first pipe at a position downstream relative to the thermostat and upstream relative to the engine.

3. The cooling system for the vehicle of claim 2, wherein:

a heater respectively connected to the first pipe at a first position immediately downstream relative to the engine and upstream relative to the engine radiator, and at a second position immediately upstream relative to the engine and immediately downstream relative to the water pump.

4. The cooling system for the vehicle of claim 2, wherein:

the control valve is connected to the first pipe through a first supply pipe at a position immediately downstream relative to the thermostat and immediately upstream relative to the first water pump.

5. The cooling system for the vehicle of claim 2, wherein:

the control valve maintains the first supply pipe in the opened state during the cold driving mode and the warm driving mode of the vehicle.

6. The cooling system for the vehicle of claim 2, wherein:

the reservoir tank is connected to the first pipe through a second connection pipe at a position downstream relative to the engine and immediately upstream relative to the engine radiator.

7. The cooling system for the vehicle of claim 1, wherein the electronics cooling circuit includes:

an electric radiator connected to the electrical equipment and the motor through the second pipe and cooling the coolant through a heat exchange with the external air; and a second water pump provided on the second pipe at a position downstream relative to the electric radiator and immediately upstream relative to the electrical equipment.

8. The cooling system for the vehicle of claim 7, wherein:

the control valve is connected to the second pipe through a second supply pipe at a position immediately downstream relative to the electric radiator and immediately upstream relative to the second water pump.

9. The cooling system for the vehicle of claim 8, wherein:

the control valve closes the second supply pipe during the warm driving of the vehicle to prevent the coolant from inflowing to the electronics cooling circuit from the reservoir tank, the second supply pipe being separate from a first supply pipe through which the control valve is connected to the first pipe.

10. The cooling system for the vehicle of claim 1, wherein:

the second pipe is separate from the first pipe.

11. The cooling system for the vehicle of claim 6, wherein:

the second connection pipe is separate from the first connection pipe.

* * * * *